United States Patent

[11] 3,574,894

| [72] | Inventor | Katashi Aoki<br>6037, Oaza Minamijo, Sakaki-machi,<br>Hanishina-gun, Nagano-ken, Japan |
|---|---|---|
| [21] | Appl. No. | 828,288 |
| [22] | Filed | May 27, 1969 |
| [45] | Patented | Apr. 13, 1971 |
| [32] | Priority | May 31, 1968 |
| [33] | | Japan |
| [31] | | 43/36919 |

[54] SYNTHETIC RESIN INJECTION MOLDING MACHINE
7 Claims, 7 Drawing Figs.

| [52] | U.S. Cl. | 18/20 |
|---|---|---|
| [51] | Int. Cl. | B29c 3/00 |
| [50] | Field of Search | 18/20 (R),<br>20 (H), 20 (RR), 30 (LM), 30 (LD) |

[56] References Cited

UNITED STATES PATENTS

| 3,337,920 | 8/1967 | Jagger et al. | 18/20(RR) |
|---|---|---|---|

FOREIGN PATENTS

| 150,032 | 5/1955 | Sweden | 18/20RR |
|---|---|---|---|

*Primary Examiner*—H. A. Kilby, Jr.
*Attorney*—David H. Semmes

ABSTRACT: A rotary injection molding machine characterized in that a pair of vertically spaced apart, but unitary connected rotary discs are intermittently rotatably carried by a main shaft of a frame, a plurality pairs of molds are disposed between said pair of rotary discs in equiangularly spaced apart relation with each other in such a manner that they may be opened or closed; and a hydraulic mold opening and closing means for opening and closing one pair of said molds in the vertical direction when it is held in a stationary position is disposed at one portion of an annular track provided upon said frame.

SYNTHETIC RESIN INJECTION MOLDING MACHINE

The present invention relates to a rotary injection molding machine for synthetic plastics in which a plurality of molds are intermittently rotated about a common axis of rotation.

In a conventional rotary injection molding machine, several pairs of molds are arranged in such a manner that each one side of the pairs of molds is disposed at regular intervals upon the lower surface of the upper rotary disc carried by a center rotary shaft, while the other molds are arranged and disposed in the similar manner upon the upper surface of the lower rotary disc. Either the upper or lower molds are arranged to move vertically so that the pairs of molds may be opened or closed. These mold assembly may be rotated intermittently together with the rotary disc, while the pairs of molds pass through a series of injection molding steps. Means for opening and closing the molds which is generally provided at a position displaced from the injection stage is comprising a cam mechanism or a link mechanism interconnected with the cam to open and close the molds. In this case, the cam groove is formed of a V-shaped groove being provided on the side surface of a guide disc, and when a cam roller on the side of the mold is moved downwardly along said cam groove the mold is opened, and when the cam roller is moved upwardly in the cam groove, the mold is closed. However, such mold opening and closing mechanism of the type described above has for example the following defects:

a. The power for opening or closing the molds is given by the rotation of the rotary discs through the cam mechanism so that the rotational resistance is increased when the mold is opened or closed, so that smooth rotations can not be expected.

b. The gradient of the cam groove may be reduced in order to decrease the rotational resistance, but the space for providing such gentle grade cam groove becomes very large as compared with other portions, so that the number of molds may be reduced.

c. The distance between the upper and lower molds when opened is equal to the vertical pitch of the cam groove which is limited within the thickness of the guide disc so that the maximum opened distance is limited.

d. Since the mold is opened or closed by the cam roller passing through the cam groove, the opening and closing of the mold depend upon the rotation of the rotary disc so that the incomplete or inaccurate alignment of a set of molds cannot be remedied without rotation.

In view of the above, the present invention has an object to eliminate the defects encountered in the conventional rotary injection molding machine. The primary object of the present invention is to provide a rotary injection molding machine provided with a novel hydraulic mold opening and closing mechanism which is actuated vertically and independently of the movement of rotary discs, thereby eliminating the use of the cam mechanism.

Another object of the present invention is to provide a synthetic resin injection molding machine incorporating therein the mold supporting plates having springs so that the molds may be securely closed and prevented from becoming loose by vibrations or impacts caused by the movement of the machine.

A further object of the present invention is to provide an injection molding machine in which a mold backing plate is interposed between the drive shaft of the rotary disc and a plurality of tie bars extending from the machine frame in parallel with the drive shaft, so that said backing plate serves as a support for said main drive shaft.

The above and other objects, features and advantages of the present invention will become more apparent from the following descriptions taken in conjunction with the accompanying drawings in which.

Figure 1:
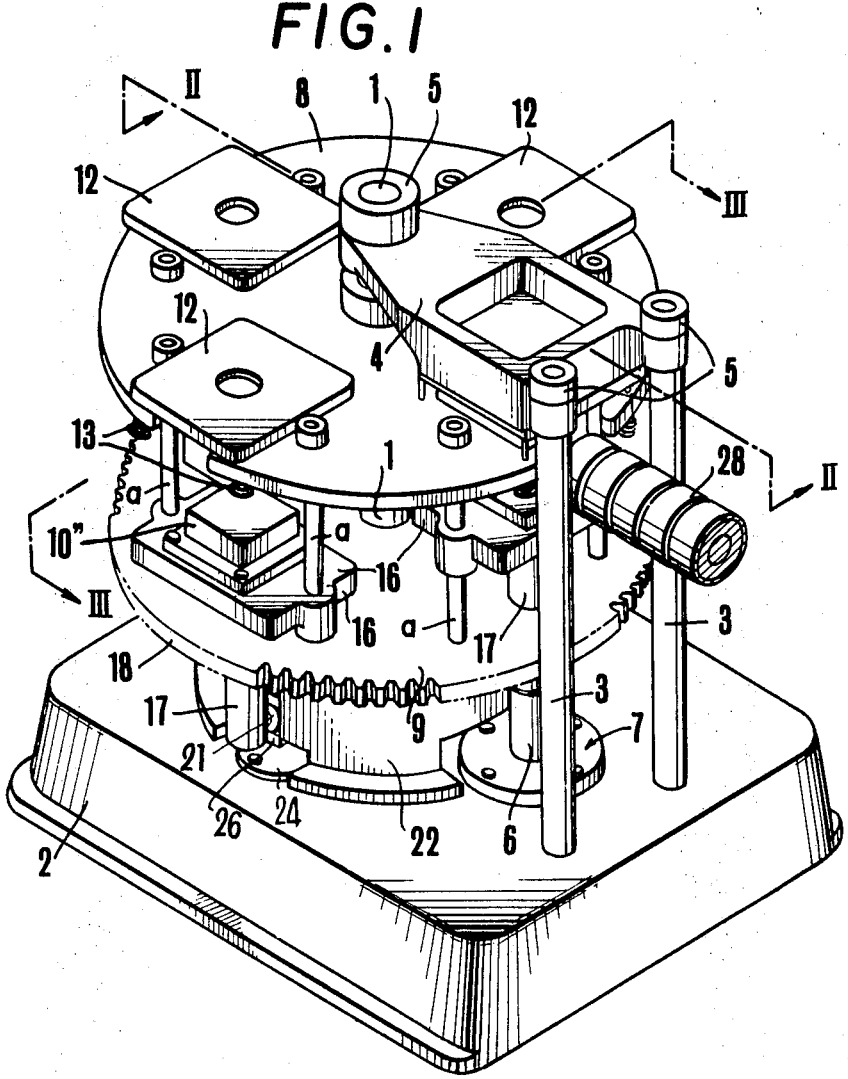
FIG. 1 is a perspective view of a mold assembly according to the present invention.

Referring to FIG. 1, a main shaft 1 is extending along the central axis of a frame 2. A supporting plate 4 is arranged in unitary construction with a pair of tie bars 3 extending in parallel with the main shaft 1 by means of nuts 5. The backing plate 4 serves as a support for the main shaft 1. A hydraulic cylinder 7 having its mold clamping ram 6 directed upwardly is disposed in the frame 2 in opposed relation with the backing plate 4.

A pair of rotary plates 8 and 9 spaced-apart vertically with each other and made in unitary construction by means of a plurality of rods $a$ are rotatably carried by the main shaft. The rods $a$ serve also as guides for the lower molds which are described in more details hereinafter. Relatively large openings 11 for mounting upper molds 10' of pairs of molds 10 are provided at equiangular intervals on the upper rotary disc 8. Upper mold supporting plates 12 are disposed so as to close the openings 11 and are connected to the rotary plate 8 through coiled springs 13 as shown in the FIGS. That is, a pair of connecting rods 14 are slidably extending through the holes formed through the rotary plate 8 in the vicinity of the upper mold supporting plate 12 and the coiled spring is interposed between the lower surface of the rotary plate 8 and the washer 15 fitted at the ends of connecting rods 14 so that each of the upper mold supporting plates 12 are made in unitary construction with the rotary plate 8. Unlike the upper mold supporting plate secured in position by means of nuts or the like, the upper mold supporting plates 12 may be pushed back upwardly against the coil springs 13 so that no excess pressure is exerted to the upper mold supporting plates 12 when the molds 10 are closed by the force applied from the below. Furthermore, the mold clamping may be ensured because of the force of the coil springs 13 which support the upper mold supporting plate 12 downwardly toward the rotary plate 8.

At the portions of the lower rotary disc 9 where corresponding to said upper mold supporting plates 12 of the upper rotary plate 8 are disposed vertically movable support rods 17 which are made in unitary construction with lower mold supporting plates 16 for supporting the lower molds 10''. Teeth 18 having a predetermined pitch are formed around the periphery of the lower rotary disc 9. A plurality of molds 10 being interposed between the above pair of rotary discs 8 and 9 are caused to rotate by means of a motor 20 whose drive shaft carries a toothed wheel 19 in mesh with the teeth 18 of the rotary disc 9. However, the teeth 18 of the rotary disc 9 may be eliminated when the main shaft 1 is rotatably supported while the pair of rotary discs 8 and 9 are fixedly carried by the main shaft 1 in such a manner that they may be rotated by the main shaft 1 which in turn is rotated by the motor.

Rollers 21 are rotatably disposed in the lower ends of the supporting rods 17, respectively. The rollers 21 are adapted to move along the annular or circular track 22 fixed upon the frame 2 so as to encircle the main shaft 1 so that when the rollers 21 are in contact with the circular track 22, the molds remain clamped. At one portion of the annular track 22, more precisely a portion spaced apart from the mold clamping hydraulic cylinder 7 in an angle of about 90° is disposed a mold opening and closing device. This device is composed of a hydraulic cylinder 24 disposed in the frame 2 downwardly of an opening 23 having the sufficient dimensions for retract therein the roller 21 and being formed at the above described portion of the annular track 22; and a U-shaped roller receiving member 26 is fixedly secured to the upper end of a vertically movable plunger 25 of the hydraulic cylinder 24, the open end of the U-shaped member 26 being directed outwardly and extended beyond the opening 23 into the annular track 22.

Figure 2:
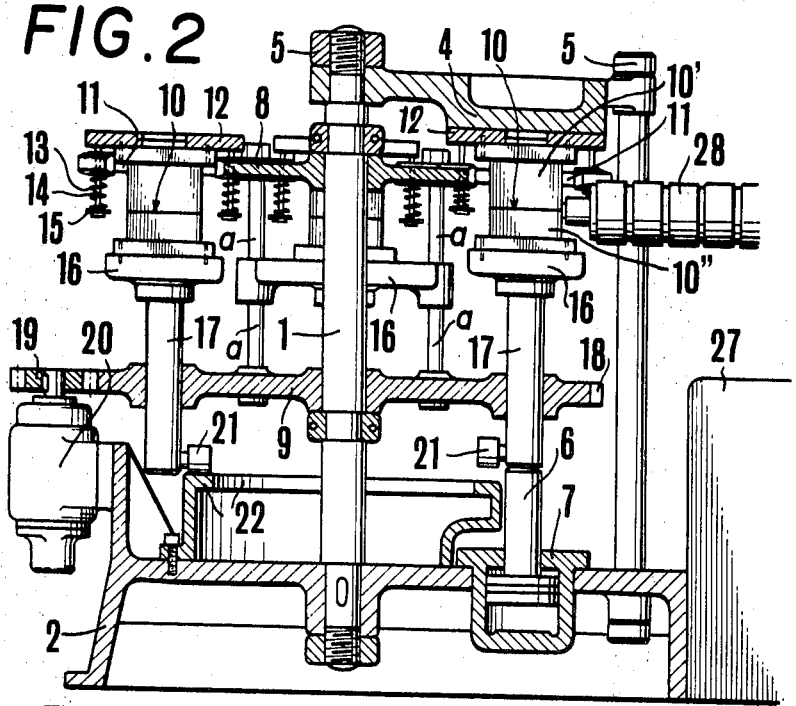
FIG. 2 is a vertical sectional view taken along the line II-II of FIG. 1.
Figure 3:
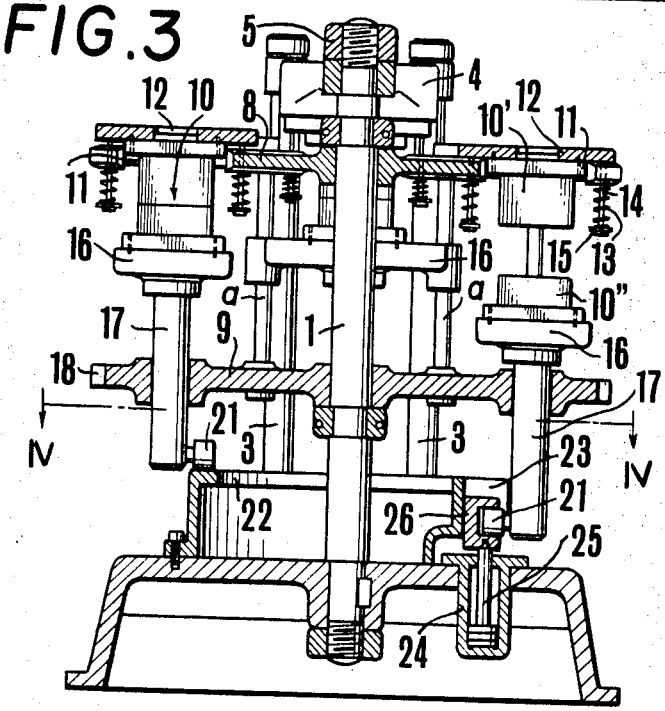
FIG. 3 is a vertical sectional view taken along the line III-III of FIG. 1.
Figure 4:
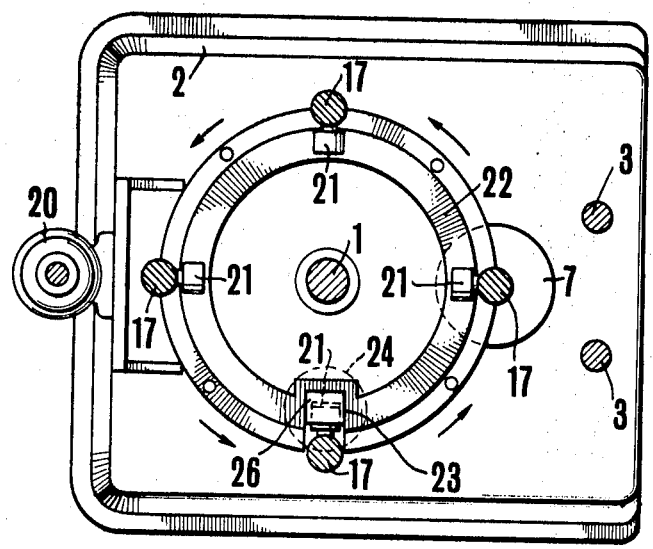
FIG. 4 is a horizontal sectional view taken along the line IV-IV of FIG. 3.
Figure 5:
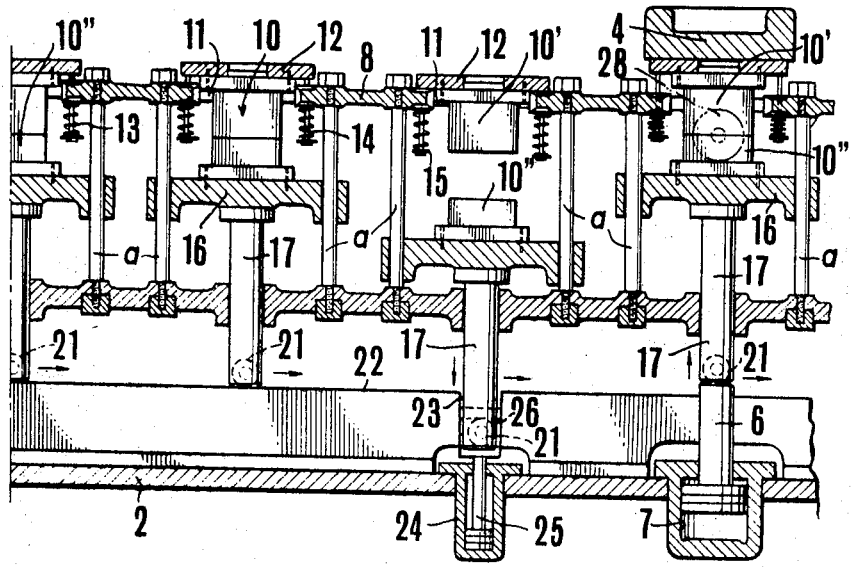
FIG. 5 is for explanation of the cycle of injection molding by the injection molding machine of the present invention, the developed vertical section view being shown for better understanding.
Figure 6:
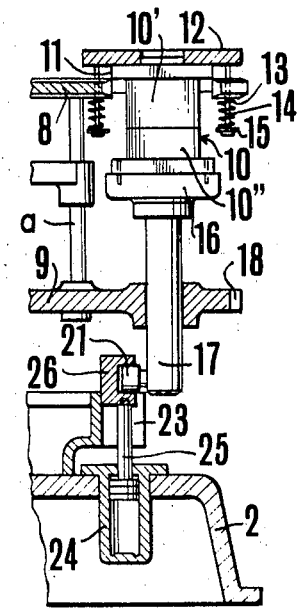
FIG. 6 is a partial vertical sectional view showing a mold which is transferred in mold opening and closing stage.

The injection device is not shown, but is disposed upon a bed 27 adjacent to the frame 2 as shown in FIG. 2. The nozzle at the top of a heating cylinder 28 is opened from the above and exterior of the frame toward the main shaft between said backing plate 4 and the mold clamping hydraulic cylinder 7 so that the nozzle may inject the synthetic plastics into the molds 10.

Next the mode of operation of the injection molding machine of the present invention having the above construction will be described with reference to FIGS. 2 to 7.

As shown in the FIGS., four sets of molds 10 are interposed between the upper and lower rotary discs 8 and 9 in such a manner that they may be opened and closed by the upper mold supporting plates 12 and the lower mold supporting plates 6 made integral with the supporting shafts 17 and adapted to be guided by the pair of rods a. When the sets of molds 10 are respectively in predetermined mold clamping and injection stage; cooling stage; and mold opening and closing stage, both of the discs 8 and 9 stand still as the drive motor 20 is stopped. When the injection is completed and when the mold clamping is released by the downward movement of the mold clamping ram 6, the discs 8 and 9 are rotated in the counterclockwise direction through a predetermined angle by the motor 20. The angle of rotation is dependent upon a number of molds 10 being provided between the discs 8 and 9. In case of the embodiment, four sets of molds 10 are provided equiangularly spaced apart from each other so that the angle of rotation becomes 90°. That is, the molds are stopped in stationary position every 90° rotation of the discs 8 and 9.

The upper molds 10' on the side of the upper disc 8 remain in close contact with the lower molds 10" by the coiled springs 13 interposed between the upper mold supporting plates 12 and the rotary disc 8 from the mold clamping and injection stage to the mold opening and closing stage through the cooling stage.

The mold 10 transferred to the mold opening and closing stage by the rotary discs 8 and 9 is opened when the roller 21 is received in the roller receiving member 26 extended beyond the opening 23 into the annular track 22 and is moved downwardly by the plunger 25 which in turn is moved downwardly by the mold opening and closing hydraulic cylinder 24 so that the lower mold supporting plate 16 is caused to move downwardly together with its supporting shaft 17 by the roller 21, thereby separating the lower mold 10" from the upper mold 10'. As the lower mold 10" is separated, the pressure applied from the below to the upper mold 10' is released so that the upper mold supporting plate 12 is returned to press against the upper surface of the rotary disc 8 by the coiled springs 13. On the other hand, when the mold clamping hydraulic cylinder 24 is actuated, the lower mold 10" is pressed against the mold 10' so as to move it upwardly because the roller receiving member 23 is caused to move upwardly again, thereby closing the pair of molds 10. When the rotary discs 8 and 9 are held in stationary position, the lower mold 10" is caused to make a reciprocal movement by the hydraulic cylinder 24 so that if the pair of molds 10 are erroneously closed, it can be done over again. Unlike the cam groove, only small space is required for vertical reciprocating of the roller receiving member 26 so that the space required for the mold opening and closing device can be minimized.

Figure 7:
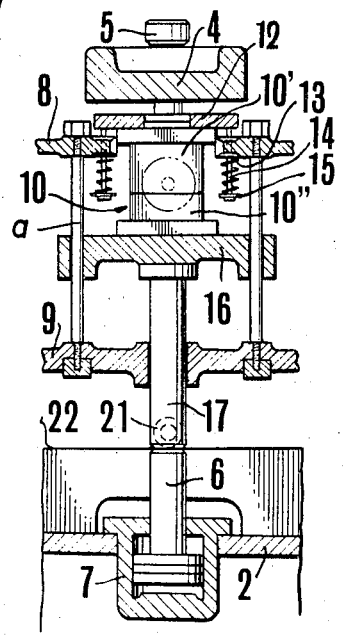
FIG. 7 is a partial vertical sectional view showing a mold in mold clamping position.

In the mold clamping and injection stage which is located in the counterclockwise direction relative to the mold opening and closing position, the supporting shaft 17 goes over the mold clamping ram 6 as best shown in FIG. 7, so that the supporting rod 17 is caused to move upwardly by the mold clamping ram 6, thus the closed molds 10 are pressed against the backing plate 4 and the plastic injection into the molds is effected through the injection nozzle. In this case, since the backing plate 12 is connected to the rotary disc 8 by means of the coil springs 13 as described above, they are under compression when the backing plate 4 is forced upwardly from the below so that even when the pair of molds 10 are returned to its normal position after completion of injection, the molds 10 remain in closed position by the force of the coil springs 13.

From the foregoing, it will be seen that the steps required for one injection molding cycle can be sequentially accomplished by the intermittent rotation of the rotary discs 8 and 9. The mold opening and closing operation can be securely accomplished at one predetermined position by the hydraulic device which reciprocates its plunger vertically. The molds can be securely closed by means of the coil springs attached to the mold supporting plate. The main shaft is securely and rigidly supported by the mold backing plate.

While the principles of the invention have been described above in connection with specific embodiments, it is to be clearly understood that this description is made only by way of example and not as a limitation on the scope of the invention.

I claim:

1. A rotary injection molding machine characterized in that a pair of vertically spaced apart, but unitary connected rotary discs are intermittently rotatably carried by a main shaft of a frame; a plurality pairs of molds are disposed between said pair of rotary discs in equiangularly spaced-apart relation with each other in such a manner that they may be opened or closed; and a hydraulic mold opening and closing means for opening and closing one pair of said molds in the vertical direction when it is held in a stationary position is disposed at one portion of an annular track provided upon said frame, further characterized in that a plurality of vertically movable supporting rods each having a roller rotatably attached to its lower end and a lower mold supporting plate connected to the upper end thereof are vertically slidably fitted to the lower disc of said pair of rotary discs; an opening is formed at one portion of said annular track upon said frame for retracting therein said roller; said mold opening and closing means comprising a hydraulic cylinder and roller receiving member which is fixedly secured to the upper end of a vertical plunger of said hydraulic cylinder is disposed in said opening, said roller receiving member being extended beyond said opening into said annular track.

2. An injection molding machine as defined in claim 1 characterized in that openings for mounting upper molds are formed in the upper rotary disc in opposed relation to the lower molds arranged upon said lower rotary disc; and upper mold supporting plates being disposed so as to close said openings are vertically movably mounted in such a manner that each of said upper mold supporting plates may be normally biased downwardly by coil springs fitted to said upper rotary disc.

3. An injection molding machine as defined in claim 2, characterized in that a mold backing plate which also serves as a support for said main shaft is joined to a pair of tie bars extending from said frame in parallel with said main shaft; and a hydraulic cylinder means is disposed in said frame in opposed relation with said backing plate with its mold clamping ram directed upwardly, whereby a pair of molds can be clamped.

4. An injection molding machine as defined in claim 3 inclusive characterized in that a nozzle at the top end of a heating cylinder of an injection device is directed toward said main shaft from the exterior of the molds between said backing plate and said mold clamping hydraulic cylinder and is made in contact with the parting line of said molds which is raised by said mold clamping ram.

5. An injection molding machine as defined in claim 4 inclusive characterized in that teeth having predetermined pitches are formed in the outer peripheral edge of said lower rotary disc so as to be in mesh with a toothed wheel carried by a drive shaft of a motor mounted upon said frame, whereby both of said rotary discs may be rotated.

6. An injection molding machine as defined in claim 4 inclusive characterized in that said main shaft is rotatably interconnected with a driving motor so that both of said rotary discs may be rotated as said main shaft is rotated.

7. An injection molding machine as defined in claim 6 inclusive characterized in that the upper mold of one pair of molds is securedly fixed to said upper mold supporting plate disposed upon said upper rotary disc while the lower mold of said molds, to the lower mold supporting plate fixed to the upper end of said supporting shaft.